(12) United States Patent
Cheng

(10) Patent No.: US 12,552,291 B2
(45) Date of Patent: Feb. 17, 2026

(54) SAFETY SEAT

(71) Applicant: Wonderland Switzerland AG, Steinhausen (CH)

(72) Inventor: Manqun Cheng, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 101 days.

(21) Appl. No.: 18/682,034

(22) PCT Filed: Aug. 23, 2022

(86) PCT No.: PCT/EP2022/073459
§ 371 (c)(1),
(2) Date: Feb. 7, 2024

(87) PCT Pub. No.: WO2023/025785
PCT Pub. Date: Mar. 2, 2023

(65) Prior Publication Data
US 2024/0383382 A1  Nov. 21, 2024

(30) Foreign Application Priority Data
Aug. 23, 2021 (CN) .......................... 202110966765.0

(51) Int. Cl.
*B60N 2/00* (2006.01)
*B60N 2/28* (2006.01)

(52) U.S. Cl.
CPC ........... *B60N 2/002* (2013.01); *B60N 2/2824* (2013.01); *B60N 2/2872* (2013.01); *B60N 2/2893* (2013.01)

(58) Field of Classification Search
CPC .... B60N 2/002; B60N 2/2824; B60N 2/2872; B60N 2/2893; B60N 2/2851; B60N 2/2884; B60N 2/289
See application file for complete search history.

(56) References Cited

U.S. PATENT DOCUMENTS 7,288,009 B2 * 10/2007 Lawrence .............. B60N 2/268
439/824
7,401,834 B2 * 7/2008 Browne ............... B60N 2/2887
296/68.1
(Continued)

FOREIGN PATENT DOCUMENTS

AU  2021201210 B1  7/2021
CN   206537175 U  10/2017
(Continued)

OTHER PUBLICATIONS

"Search Report Issued in Corresponding Japanese Patent Application No. 2024-510392", Mailed Date: Feb. 28, 2025, 58 pages.
(Continued)

*Primary Examiner* — Brian M O'Hara
(74) *Attorney, Agent, or Firm* — Volpe Koenig

(57) ABSTRACT

A safety seat includes a sitting part, an anchoring device, two movable side protective blocks, a side protective block driving module, an anchoring device sensor and a control module. The anchoring device sensor is arranged adjacent to the anchoring device. The side protective block driving module is connected with the side protective blocks to drive the side protective blocks to be folded or unfolded. The control module is electrically connected with the anchoring device sensor and the side protective block driving module, and senses whether the sitting part is occupied. The control module controls the side protective block driving module to control at least one of the side protective blocks to be unfolded when the control module senses that the anchoring device is in a locking state through the anchoring device sensor and the sitting part is occupied, improving capability of the side impact protection of the safety seat.

13 Claims, 20 Drawing Sheets

(56) References Cited

U.S. PATENT DOCUMENTS

| | | | | |
|---|---|---|---|---|
| 8,179,274 | B2* | 5/2012 | Rork | B60R 22/48 |
| | | | | 340/425.5 |
| 9,381,835 | B2* | 7/2016 | Szakelyhidi | B60N 2/2821 |
| 10,239,487 | B2* | 3/2019 | Bailliard | G01C 9/00 |
| 10,600,302 | B2* | 3/2020 | Cech | B60N 2/0022 |
| 12,005,856 | B2* | 6/2024 | Barnes | G01L 1/22 |
| 2015/0091348 | A1 | 4/2015 | Juchniewicz et al. | |
| 2019/0299897 | A1 | 10/2019 | Gramenos | |
| 2020/0101876 | A1 | 4/2020 | Cui | |
| 2020/0269807 | A1* | 8/2020 | Tardif | B60N 2/272 |

FOREIGN PATENT DOCUMENTS

| | | |
|---|---|---|
| CN | 109895664 A | 6/2019 |
| CN | 110723038 A | 1/2020 |
| CN | 112208403 A | 1/2021 |
| CN | 112208405 A | 1/2021 |
| CN | 212950272 U | 4/2021 |
| CN | 112208403 B | 2/2022 |
| DE | 19834847 C1 | 10/1999 |
| EP | 3112209 A1 | 1/2017 |
| EP | 3473492 A1 | 4/2019 |
| EP | 4049893 A1 | 8/2022 |
| JP | H02177157 A | 7/1990 |
| JP | H03059228 U | 6/1991 |
| JP | 2001047902 A | 2/2001 |
| JP | 2016037282 A | 3/2016 |
| JP | 2020083217 A | 6/2020 |
| JP | 2021017239 A | 2/2021 |
| WO | 2021094523 A1 | 5/2021 |

OTHER PUBLICATIONS

"Notice of Allowance Issued in Corresponding European Patent Application No. 22768766.2", Mailed Date: Mar. 31, 2025, 48 pages.

"First Office Action Issued in Corresponding Japanese Patent Application No. 2024-510392", Mailed Date: Apr. 1, 2025, 10 pages.

Taiwanese Office Action issued in corresponding Application No. 111131669 dated Jul. 7, 2023.

International Search Report and Written Opinion for Application No. PCT/EP2022/073459 dated Dec. 6, 2022.

China National Intellectual Property Administration. Office Action issued in corresponding application CN 202110966765.0, dated Jan. 9, 2026. English translation provided.

Japan Patent Office. Office Action issued in corresponding application JP 2024-510392, dated Oct. 21, 2025. 8 pages.

* cited by examiner

SAFETY SEAT

CROSS-REFERENCE TO RELATED APPLICATIONS

This application is a U.S. National Stage Application of PCT/EP2022/073459, filed on Aug. 23, 2022, which claims the benefit of Chinese Patent application Ser. No. 202110966765.0, filed on Aug. 23, 2021, both of which are incorporated herein by reference in their entirety.

TECHNICAL FIELD

The present disclosure relates to a safety seat, in particular to a safety seat having a function of lateral protection.

BACKGROUND

It has been popular to provide a safety seat for a child siting in vehicle for consideration of a safe and comfortable riding space. The safety seat is a device that restrains the child thereon through a restraining device. In an event of emergency braking or accidental collision of the vehicle, the safety seat slows down an impact force on the child through its housing, and restricts a movement of the child through its restraining device, to reduce injuries to the child in accidents and ensure safety of the child siting in the vehicle. Some of the safety seats have side protective blocks on both sides thereof to provide side impact protection. Some of the side protective blocks are designed to be foldable to reduce a space occupied by the safety seat. Among these side protective blocks, some of the side protective blocks may be unfolded manually, and thus require a user to initiatively open the side protective blocks. However, sometimes the user may forget to unfold the side protective block in use, thereby invaliding or greatly reducing the side protection function of the side protective blocks.

SUMMARY

In order to remedy deficiencies in the prior art, the technical problem to be solved by the present disclosure is to provide a safety seat, which can automatically unfold the side protective blocks to be protruded when it is sensed that the safety seat is occupied after the safety seat is installed on a vehicle seat, so as to produce the side protection effect.

According to an embodiment of the present disclosure, the safety seat comprises a sitting part, an anchoring device (which may also referred to as "fixing device"), two movable side protective blocks, a side protective block driving module, an anchoring device sensor and a control module. The anchoring device sensor is arranged adjacent to the anchoring device. The side protective block driving module is connected with the side protective blocks to drive the side protective blocks to be folded or unfolded. The control module is electrically connected with the anchoring device sensor and the side protective block driving module, and senses whether the sitting part is occupied. The control module controls the side protective block driving module to control at least one of the side protective blocks to be unfolded when the control module senses that the anchoring device is in a locking state through the anchoring device sensor and the sitting part is occupied, so as to increase a side impact protection capability of the safety seat. Therefore, the side protective block can be automatically unfolded without an operation of the user (such as a parent or a driver), effectively solving the problem that the side protection function of the side protective block is invalid or greatly reduced due to negligence of the user.

The advantages and spirit of the present disclosure can be further understood by the following detailed description of the present disclosure and the attached drawings.

Figure 1:
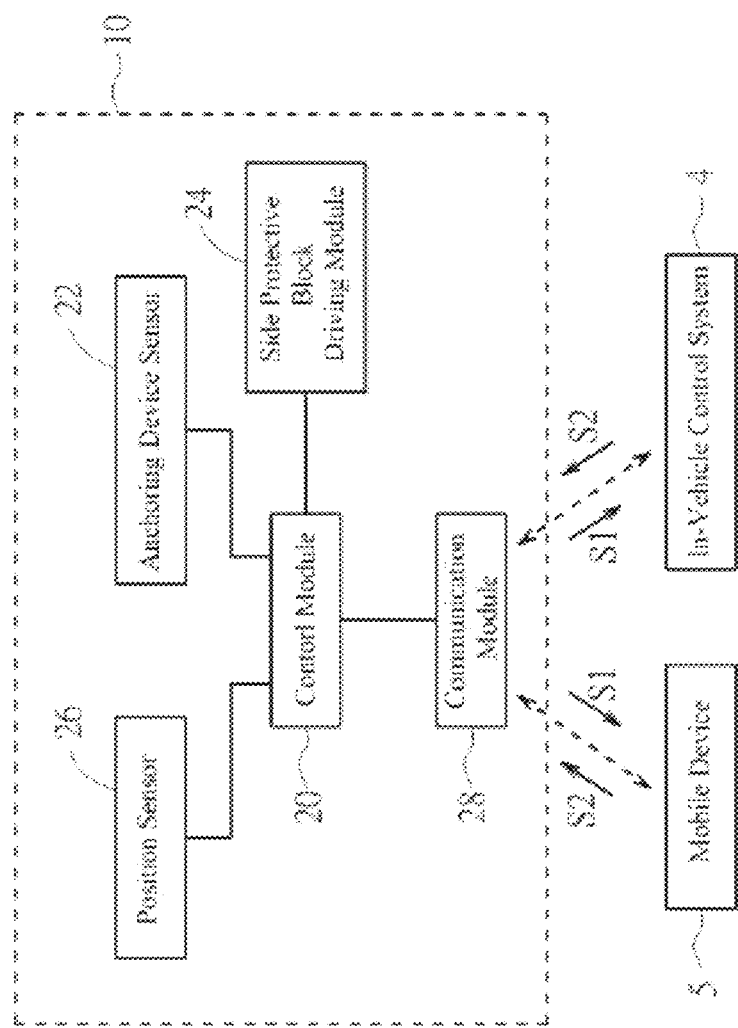
FIG. 1 is a functional block diagram of a safety seat according to an embodiment of the present disclosure.

The reference numbers are described as follows:
1, 6, 7: safety seat
10: control circuit
12: seat body
122, 622, 722: sitting part
124: backrest
126: fixing seat
1262: locking groove
14: anchoring device
142: structural frame
144: anchoring hook
144a: rotation axis
144b: clamping slot
146: operating element
146a: sliding direction
1462: restraining part 1464: sensed part
1466: operating part
1468: sliding groove
148, 158: restoring spring
150, 160: torsion spring
152: unlocking element
152a: inclined surface
154: movable pin
154a: sliding direction
156: stopper
17: side protective block
172: housing
174: locking block
174a: linkage rod
174b: operating part
176: biasing spring
18: fastening assembly
182: actuating part
184: rotatable shaft part
186: fastening part
1862: fastener
20: control module
22: anchoring device sensor
24: side protective block driving module
240: driving mechanism
242: motor
242a: pinion
244: gear set
244a: axial direction
2442: driving gear
2442a: wavy teeth
2444: clutch gear
2444a: wavy teeth
2446: driven gear
2446a: arc-shaped groove
2446b, 2446c: end
2448: restoring spring
246: toggle switch
26, 26': position sensor
27: torsion spring
28: communication module
4: in-vehicle control system
5: mobile device
61, 71: base
62, 72: basket
622, 722: sitting part
63, 73: side protective block
64, 74: anchoring device
65, 75: adjustable supporting leg
s1: request signal
s2: setting signal
s102, s104, s106, s108, s110: implementation step

DETAILED DESCRIPTION

Figure 2:
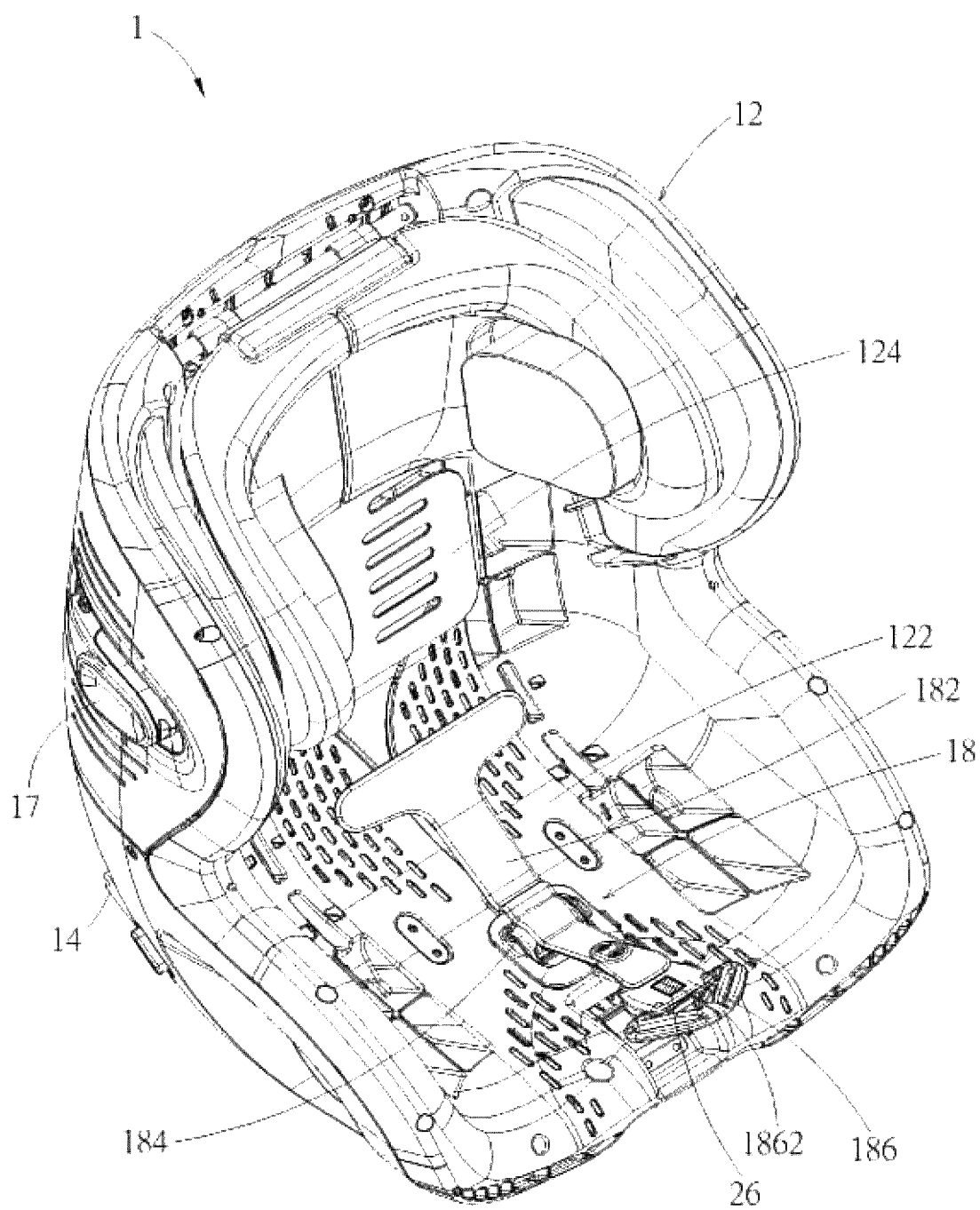
FIG. 2 is a schematic view of the safety seat shown in FIG. 1.
Figure 3:
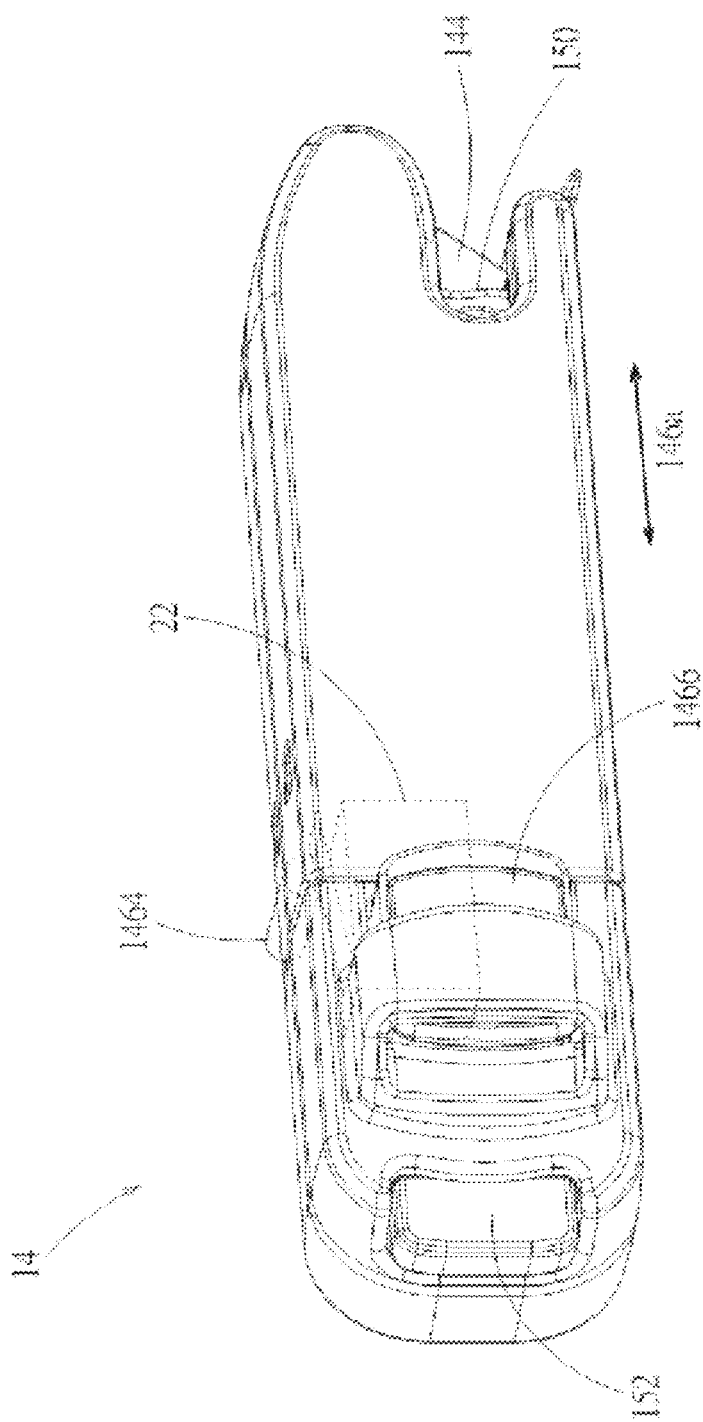
FIG. 3 is a schematic view of an anchoring device of the safety seat shown in FIG. 2.

Referring to FIGS. 1 and 2, a safety seat 1 according to an embodiment of the present disclosure includes a seat body 12, two anchoring devices 14, two movable side protective blocks 17 and a fastening assembly 18. The seat body 12 is locked to an anchoring structure provided on a vehicle seat via an anchoring device 14 to install the safety seat 1 on a vehicle seat. The side protective blocks 17 are movably arranged on the seat body 12. The side protective blocks 17 may be unfolded to protrude outward relative to the seat body 12, so as to produce a side protection effect, and the side protective blocks 17 may also be folded to facilitate storage of the safety seat 1. The fastening assembly 18 is movably arranged on a sitting part 122 of the seat body 12 and detachably connected with a safety belt, and a child sitting on the sitting part 122 can be firmly fixed on the safety seat 1 by the safety belt.

The safety seat 1 according to this embodiment is further provided with a control circuit 10 including a control module 20, an anchoring device sensor 22 and a side protective block driving module 24. The control module 20 is electrically connected to the anchoring device sensor 22 and the side protective block driving module 24, respectively. The anchoring device sensor 22 is disposed adjacent to the anchoring device 14. The side protective block driving module 24 is connected with the side protective blocks 17 to drive the side protective blocks to be folded or unfolded. The control module 20 may sense a state of the anchoring device 14 via the anchoring device sensor 22. When the control module 20 senses that the anchoring device 14 is in a locking state by the anchoring device sensor 22 and the sitting part 122 is occupied, the side protective block driving module 24 is controlled to allow at least one of the side protective blocks 17 to be unfolded, so as to provide a side impact protection for the safety seat 1.

Figure 4:
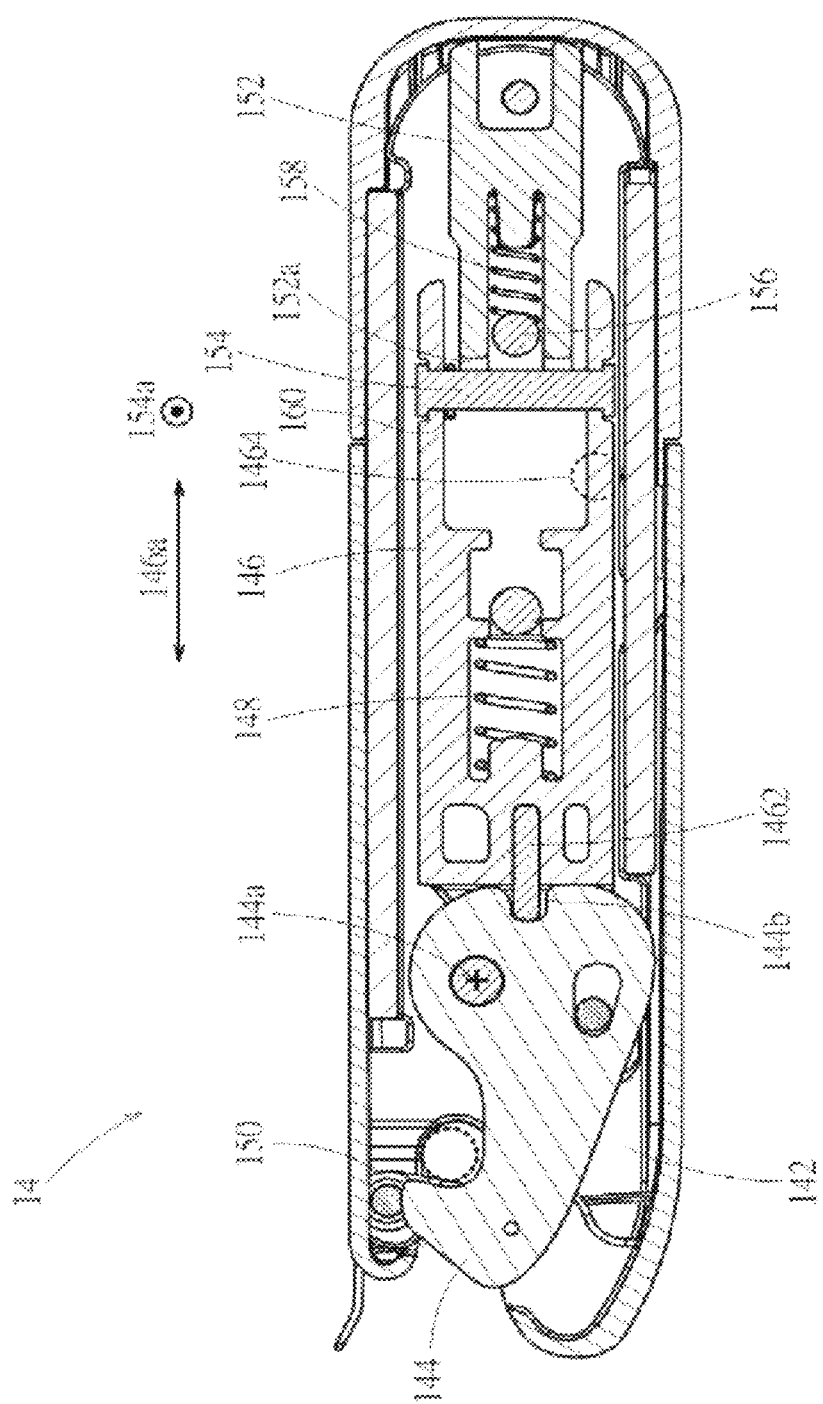
FIG. 4 is a cross-sectional view of the anchoring device shown in FIG. 3 in a locking state.
Figure 5:
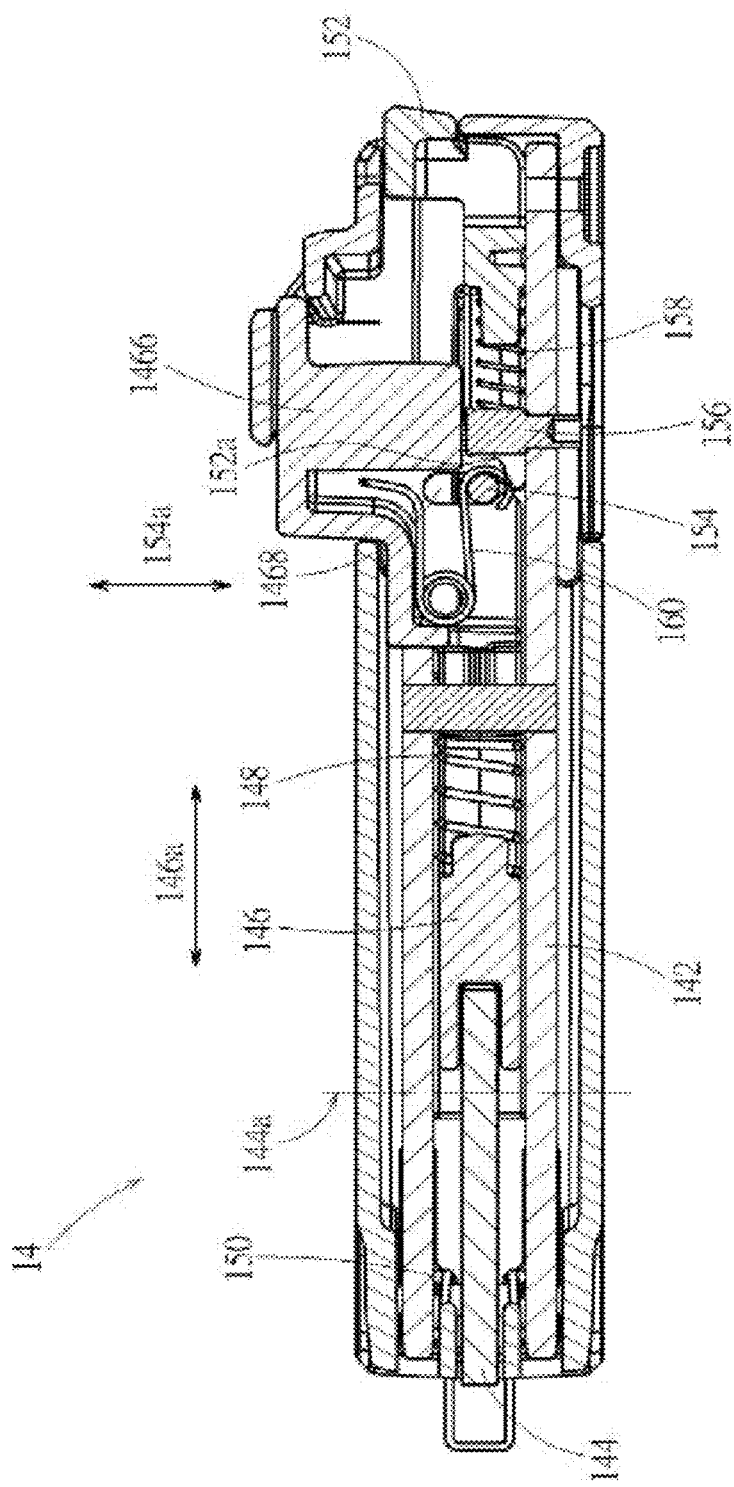
FIG. 5 is another cross-sectional view of the anchoring device shown in FIG. 3 in a locking state, a cross-sectional plane shown in FIG. 5 being perpendicular to that of FIG. 4.
Figure 6:
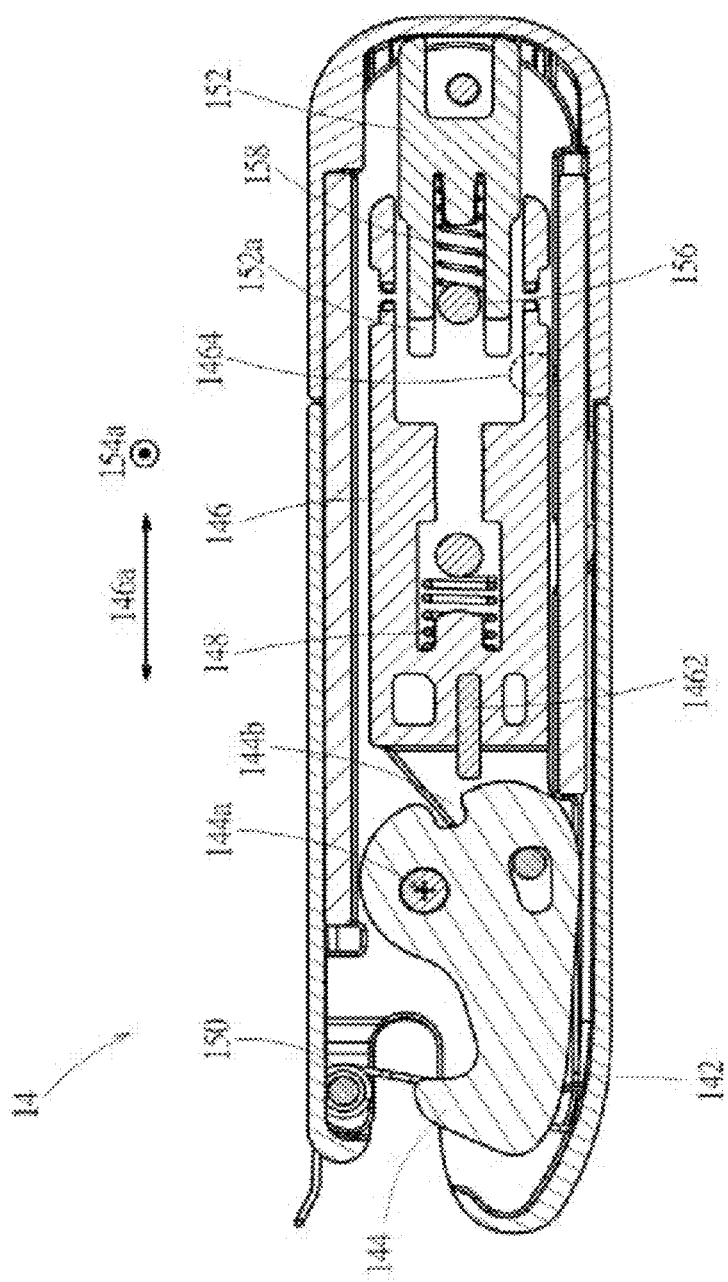
FIG. 6 is a cross-sectional view of the anchoring device shown in FIG. 3 in an unlocking state.
Figure 7:
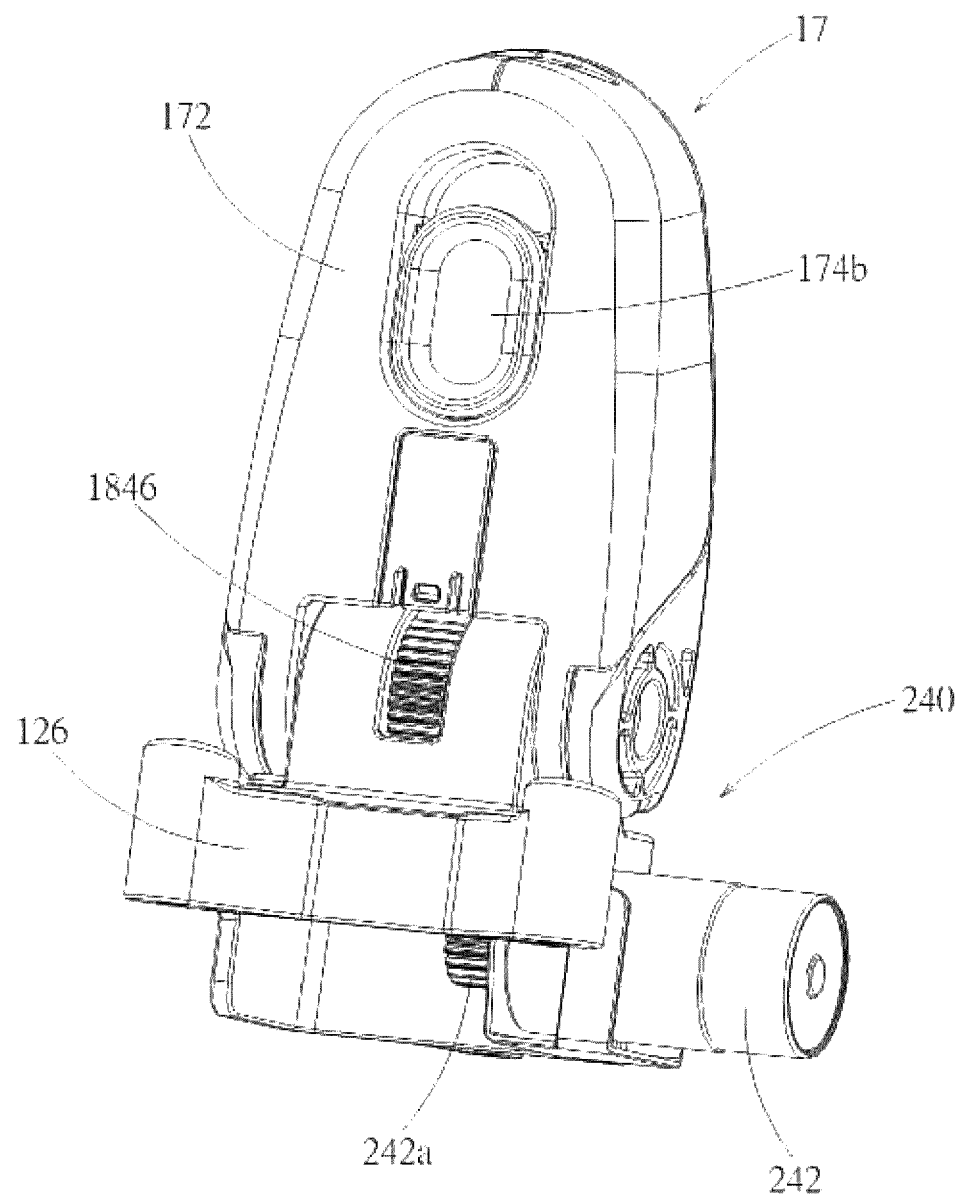
FIG. 7 is a schematic view of a combination of a side protective block and a driving mechanism shown in FIG. 2.
Figure 8:
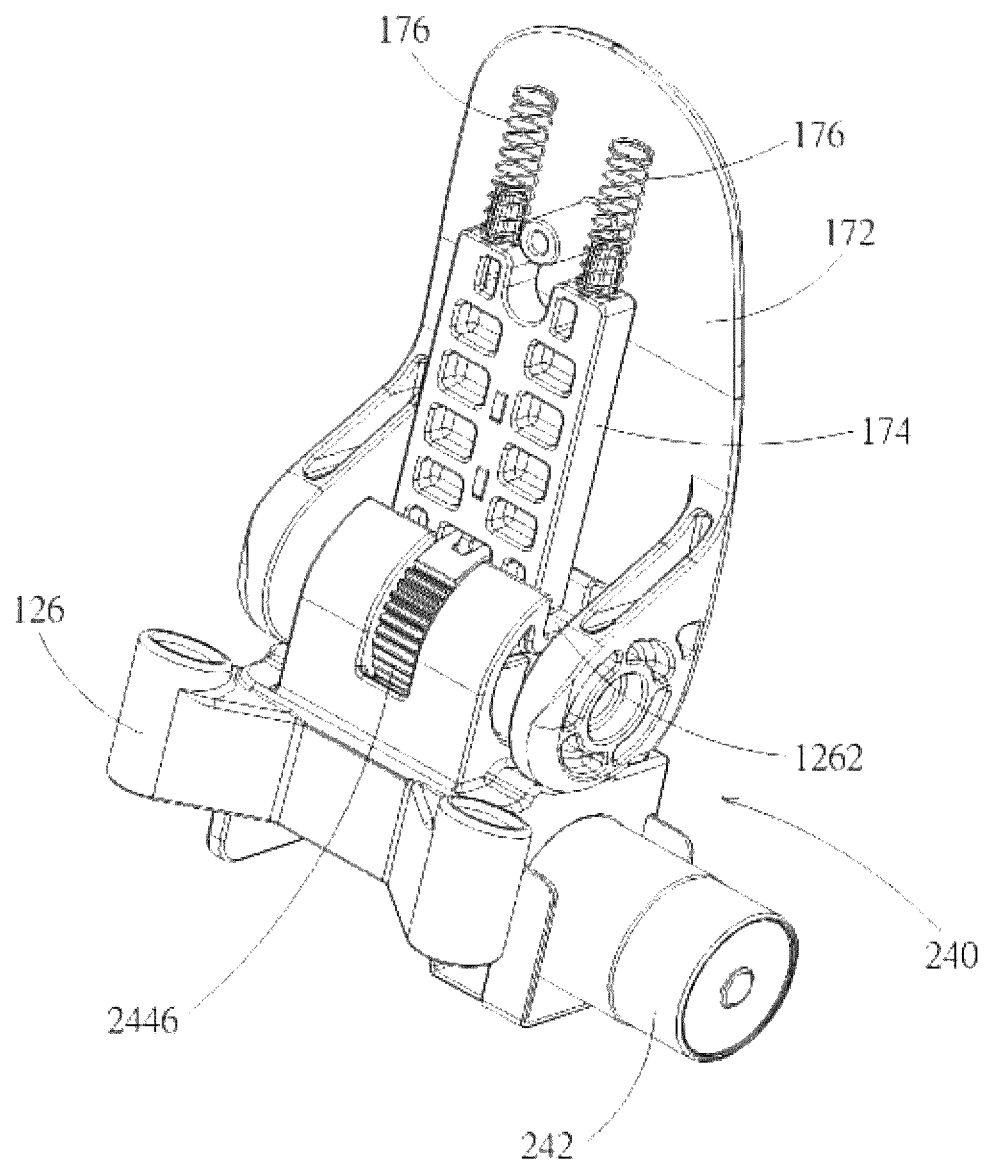
FIG. 8 is a schematic view of an inner structure of the side protective block shown in FIG. 7.

Further referring to FIGS. 3 to 6, in this embodiment, the anchoring device 14 includes a structural frame 142, an anchoring hook 144 and an operating element 146. The anchoring hook 144 is pivotally connected to the structural frame 142, so that the anchoring hook 144 has a rotation axis 144a (indicated by a cross in FIGS. 4 and 6, and indicated by a chain line in FIG. 5), and is rotatable relative to the structural frame 142 with the rotation axis 144a and may be located in a locking position (as shown in FIG. 4) and an unlocking position (as shown in FIG. 6). The anchoring device 14 is in a locking state (as shown in FIG. 4) when the anchoring hook 144 is in the locking position, in principle, the anchoring device 14 can be engaged with the anchoring structure indicated by a thick dotted circle in FIG. 4, for example, the anchoring hook 144 hooks a cross rod of the anchoring structure, so that the safety seat 1 is firmly installed on the vehicle seat. The anchoring device 14 is disengaged from the anchoring structure when the anchoring hook 144 rotates to an unlocking position, in order to remove the safety seat 1 from the vehicle seat.

The operating element 146 is slidably disposed in a sliding direction 146a (indicated by a double arrow) relative to the structural frame 142 and has a restraining part 1462, and the sliding direction 146a is perpendicular to the rotation axis 144a. The restraining part 1462 is capable of restraining the rotation of the anchoring hook 144, for example, restricting or preventing the rotation of the anchoring hook 144. In this embodiment, the restraining part 1462 is sheet-shaped, and when the anchoring hook 144 is in the locking position, the restraining part 1462 is engaged (e.g., clamped) into a clamping slot 144b of the anchoring hook 144 to prevent the rotation of the anchoring hook 144. Further, a restoring spring 148 that abuts between the operating element 146 and the structural frame 142 is used in the anchoring device 14 to slide the operating element 146 towards the anchoring hook 144, which facilitates keeping the restraining part 1462 in a state of being clamped into the clamping slot 144b. In addition, the operating element 146 has an exposed operating part 1466, which may be operated by a user (e.g., a parent or a driver) to move the operating element 146 in the sliding direction 146a, for example, disengage the restraining part 1462 from the clamping slot 144b, so that the anchoring hook 144 rotates towards the unlocking position under an action of bias of the torsion spring 150, that is, the anchoring hook 144 is constantly biased towards the unlocking position. In addition, when the anchoring hook 144 is in the unlocking position, that is, the anchoring device 14 is in the unlocking state, the anchoring hook 144 is kept in the unlocking position under the action of the bias of the torsion spring 150.

In addition, in this embodiment, the anchoring device 14 provides a safety lock mechanism with respect to the operating element 146, to prevent the restraining part 1462 from disengaging from the clamping slot 144*b* due to accidental sliding of the operating element 146, for example, caused by a vibration generated during driving, or a situation that the user accidentally slides the operating element 146, resulting in failure of the anchoring function of the anchoring device 14. The safety lock mechanism includes an unlocking element 152, a movable pin 154 and a stopper 156. The unlocking element 152 is slidably disposed on the structural frame 142. The movable pin 154 is slidably disposed in the sliding groove 1468 of the operating element 146 in a sliding direction 154*a* (indicated by a double arrow). The stopper 156 is fixed on the structural frame 142 to stop the movable pin 154 from moving in the sliding direction 146*a*, thereby preventing the operating element 146 from accidentally moving in the sliding direction 146*a*. The unlocking element 152 may move the movable pin 154 along an inclined surface 152*a* (i.e., slide relative to the operating element 146 in the sliding direction 154*a*), so that the movable pin 154 can avoid structurally interfering with the stopper 156 in the sliding direction 146*a* (i.e., releasing the operating element 146), and thus the operating element 146 smoothly moves in the sliding direction 146*a*. The movable pin 154 may be selectively stopped by the stopper 156 as long as the sliding direction 154*a* is not parallel to the sliding direction 146*a*. In the actual operation, the user may move the unlocking element 152 to release the operating element 146, and then move for example the operating part 1466 of the operating element 146 to disengage the restraining part 1462 from the clamping slot 144*b* of the anchoring hook 144. At this time, the anchoring hook 144 rotates to the unlocking position under the action of the bias of the torsion spring 150, so that the anchoring device 14 is disengaged from the anchoring structure. In addition, a restoring spring 158 that abuts between the unlocking element 152 and the stopper 156 is used in the safety lock mechanism to disengage the inclined surface 152*a* of the unlocking element 152 from the movable pin 154, and a torsion spring 160 that is provided on the operating element 146 is used in the safety lock mechanism to return the movable pin 154 to its original position, that is, the stopper 156 may stop the movable pin 154 again.

In addition, in this embodiment, the operating element 146 also has a sensed part 1464, a projected position of which is indicated by a dotted circle in FIGS. 4 and 6. The sensed part 1464 may slide together with the operating element 146 to trigger the anchoring device sensor 22, so that the control module 20 senses a state of the anchoring device 14 through the anchoring device sensor 22. In this embodiment, the anchoring device sensor 22 may be a limit switch, and the sensed part 1464 triggers the anchoring device sensor 22 by pushing an actuator of the limit switch. Therefore, when the anchoring device 14 is in the locking state, that is, the anchoring hook 144 is in the locking position, the restraining part 1462 restrains the rotation of the anchoring hook 144, and the sensor 1464 triggers the anchoring device sensor 22. In the practical application, the anchoring device sensor 22 may also be a proximity sensor or other sensors that may sense a position of the sensed part 1464. As another example, the anchoring device sensor 22 may also be a pair of contacts, and when the sensed part 1464 conducts the contacts, it may be logically regarded as triggering the anchoring device sensor 22. In the practical application, the anchoring device sensor 22 may also be directly triggered by the anchoring hook 144. In addition, in the practical application, the anchoring device sensor 22 may be structurally integrated with the anchoring device 14. For example, the anchoring device sensor 22 is fixed on the structural frame 142 of the anchoring device 14, and a casing covers both the anchoring device sensor 22 and the anchoring device 14, to avoid external objects from interfering with the action of the anchoring device sensor 22, for example, the external objects mistakenly trigger the anchoring device sensor 22, which may result in misjudgment of the control module 20.

Referring to FIGS. 1, 2, 7 to 9, in this embodiment, the side protective blocks 17 are pivotally connected to a fixing seat 126 of the seat body 12. The side protective block driving module 24 is connected to the side protective blocks 17 via two driving mechanisms 240, and the two driving mechanisms 240 are respectively arranged corresponding to the side protective blocks 17. The driving mechanism 240 includes a motor 242 and a gear set 244. The motor 242 (e.g., a servo motor) is provided on the fixing seat 126. The motor 242 is coupled with the corresponding side protective block 17 via the gear set 244. Thus, the control module 20 may control the side protective block driving module 24 to control the operation of the motor 242 and thus drive the corresponding side protective block 17 through the gear set 244, so that the corresponding side protective blocks 17 can protrude outward relative to the seat body 12 or the corresponding side protective blocks 17 are folded.

The fixing seat 126 has a locking groove 1262. The side protective block 17 includes a housing 172, a locking block 174 and a biasing spring 176. The housing 172 is pivotally connected with the fixing seat 126. The locking block 174 is slidably disposed in the housing 172. The biasing spring 176 abuts against the locking block 174 to drive the locking block 174 to slide towards the locking groove 1262. The gear set 244 includes, but is not limited to, a driving gear 2442, a clutch gear 2444 and a driven gear 2446. The motor 242 may be engaged with the driving gear 2442 via a pinion 242*a*. The driving gear 2442 and the clutch gear 2444 are coaxially arranged and are detachably engaged in an axial direction 244*a* (shown by a chain line in FIG. 9). The driving gear 2442 and the clutch gear 2444 are detachably engaged via wavy teeth 2442*a* and 2444*a* protruding in parallel to the axial direction 244*a*, and the driving gear 2442 and the clutch gear 2444 slide relative to each other through the wavy teeth 2442*a* and 2444*a* to be detachably engaged with each other. The clutch gear 2444 is engaged with the driven gear 2446. The driven gear 2446 is connected with a linkage rod 174*a* fixed on the locking block 174. Thus, the motor 242 may drive the side protective blocks 17 to rotate relative to the seat body 12 via the gear set 244 and the linkage rod 174*a*. In addition, in this embodiment, the gear set 244 includes a restoring spring 2448 which abuts against the clutch gear 2444 to drive the driving gear 2442 to be engaged with the clutch gear 2444. The detachable engagement of the driving gear 2442 with the clutch gear 2444 can prevent the motor 242 from being stalled and prevent the side protective blocks 17 from being disconnected from the motor 242 when being interfered. In the practical application, the restoring spring 2448 may alternatively be arranged on a side of the driving gear 2442 to abut against the driving gear 2442 so as to engage the driving gear 2442 with the clutch gear 2444. This structural configuration can also provide an effect of preventing the motor 242 from being stalled. Those skilled in the art could understood that although this embodiment provides a design having the gear set 244, the present disclosure is not limited thereto. Any design different from the gear set 244 should be covered by the present disclosure as long as it can achieve the effect of the present disclosure.

Figure 10:
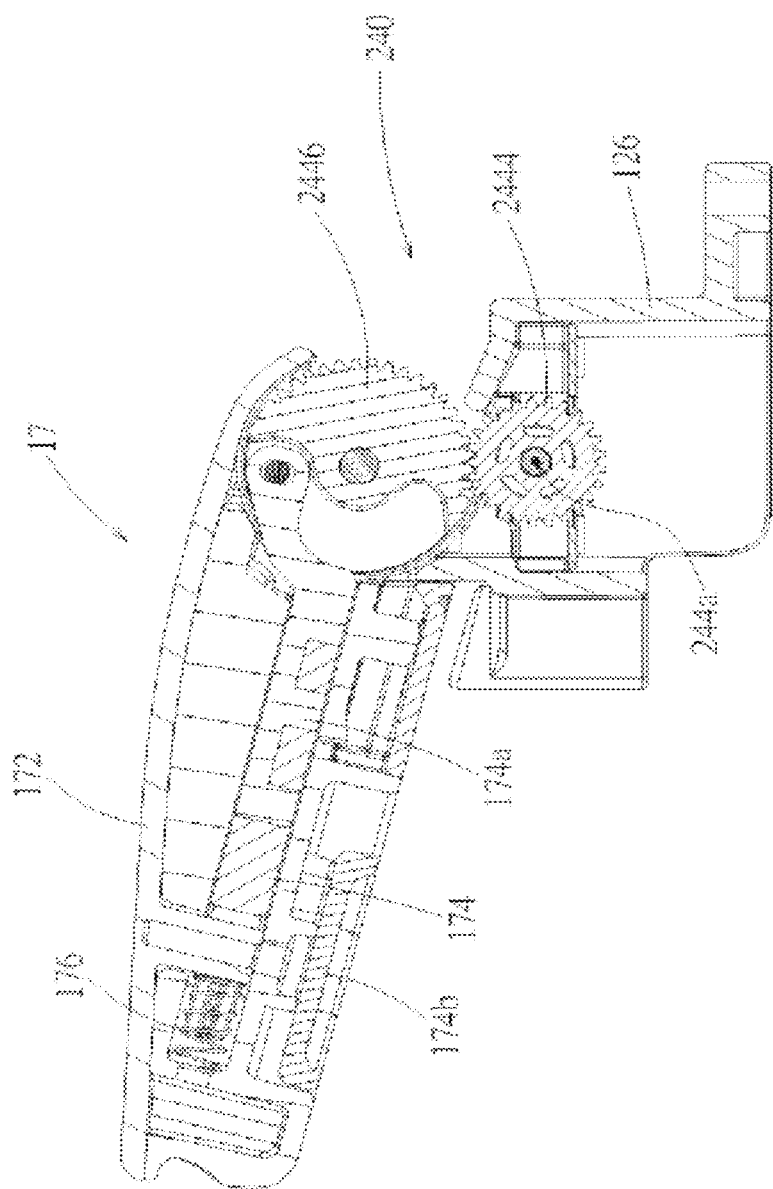
FIG. 10 is a cross-sectional view of the side protective block in a folded position.
Figure 11:
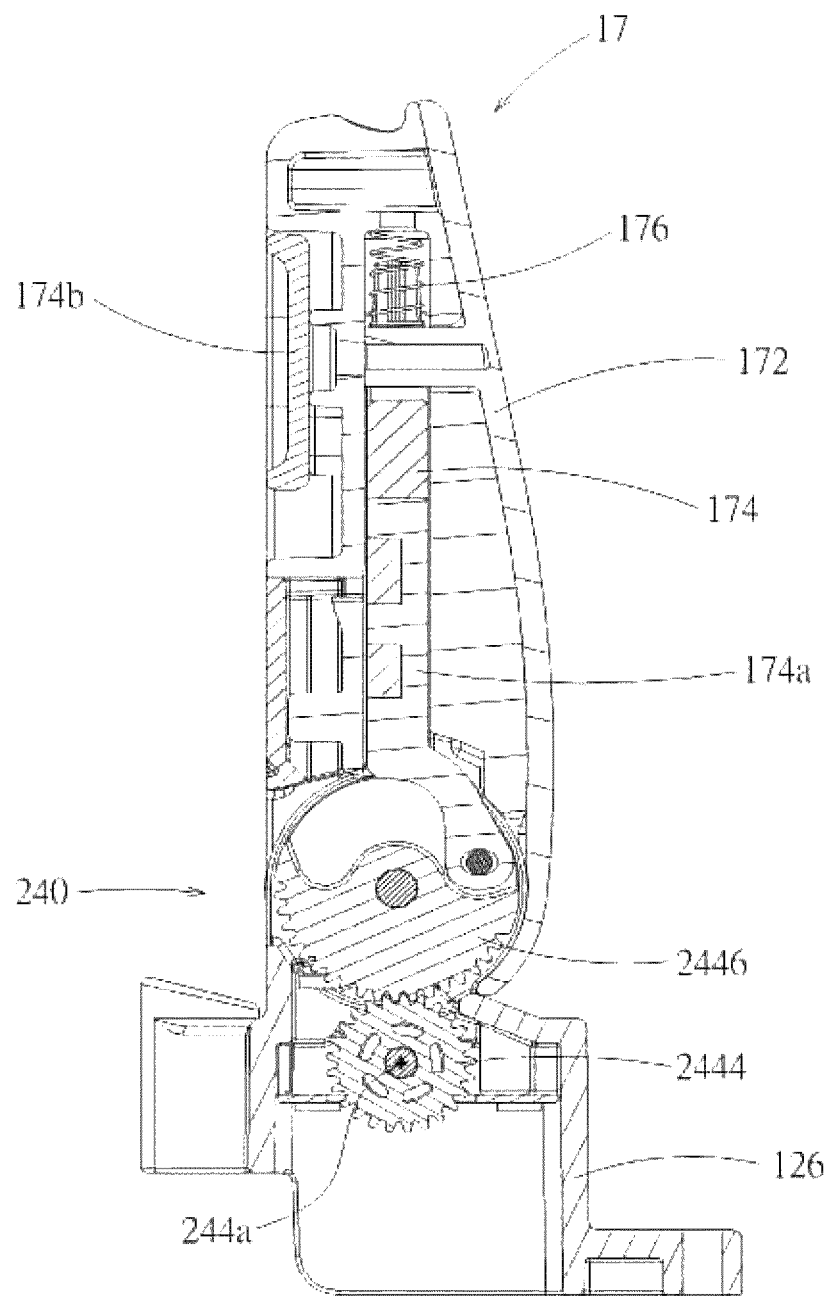
FIG. 11 is a cross-sectional view of a side protective block that is rotated to an unfolded position.
Figure 12:
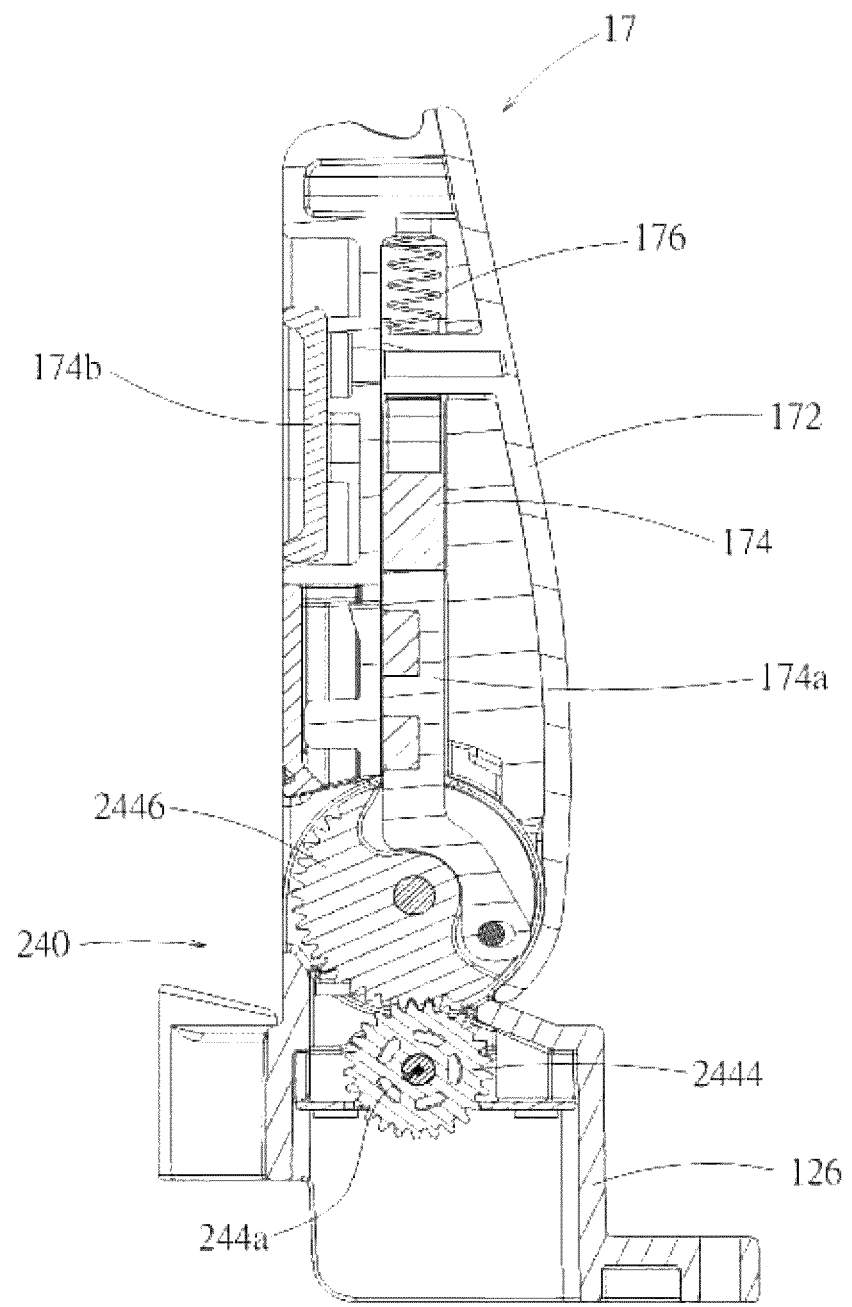
FIG. 12 is a cross-sectional view illustrating that the side protective block in the unfolded position is in the locking state.

Further referring to FIGS. 10 to 12, the driven gear 2446 drives the side protective blocks 17 to rotate from a folded position (which may also be referred to as "closed position", as shown in FIG. 10) to an unfolded position (as shown in FIG. 11) relative to the seat body 12 via the linkage rod 174*a*. During rotation, the locking block 174 slides on the fixing seat 126. When the side protective block 17 is in the unfolded position, the locking block 174 is aligned with the locking groove 1262; and when the driven gear 2446 continues to rotate, the driven gear 2446 links with the linkage rod 174*a* (of the locking block 174) to drive the locking block 174 to slide into the locking groove 1262 in a direction perpendicular to the axial direction 244*a*, so that the side protective block 17 is in a locking state (as shown in FIG. 12) to be kept in the unfolded position, which can effectively provide side impact protection for the safety seat 1. The locking block 174 has an exposed operating part 174*b*, and the user may slide the operating part 174*b* to disengage the locking block 174 from the locking groove 1262.

Figure 9:
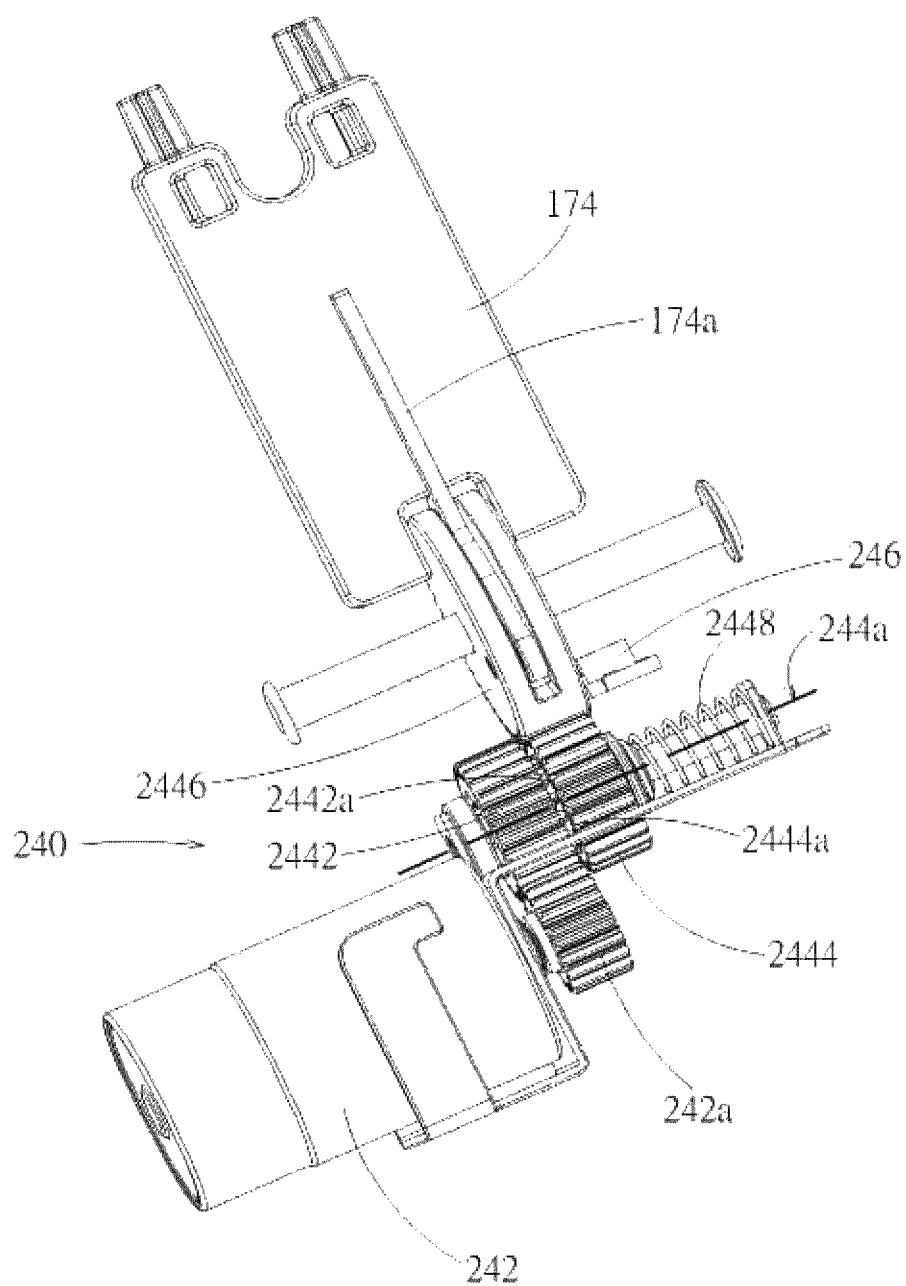
FIG. 9 is a schematic view illustrating the side protective block shown in FIG. 7 coupled to a corresponding driving mechanism.
Figure 13:
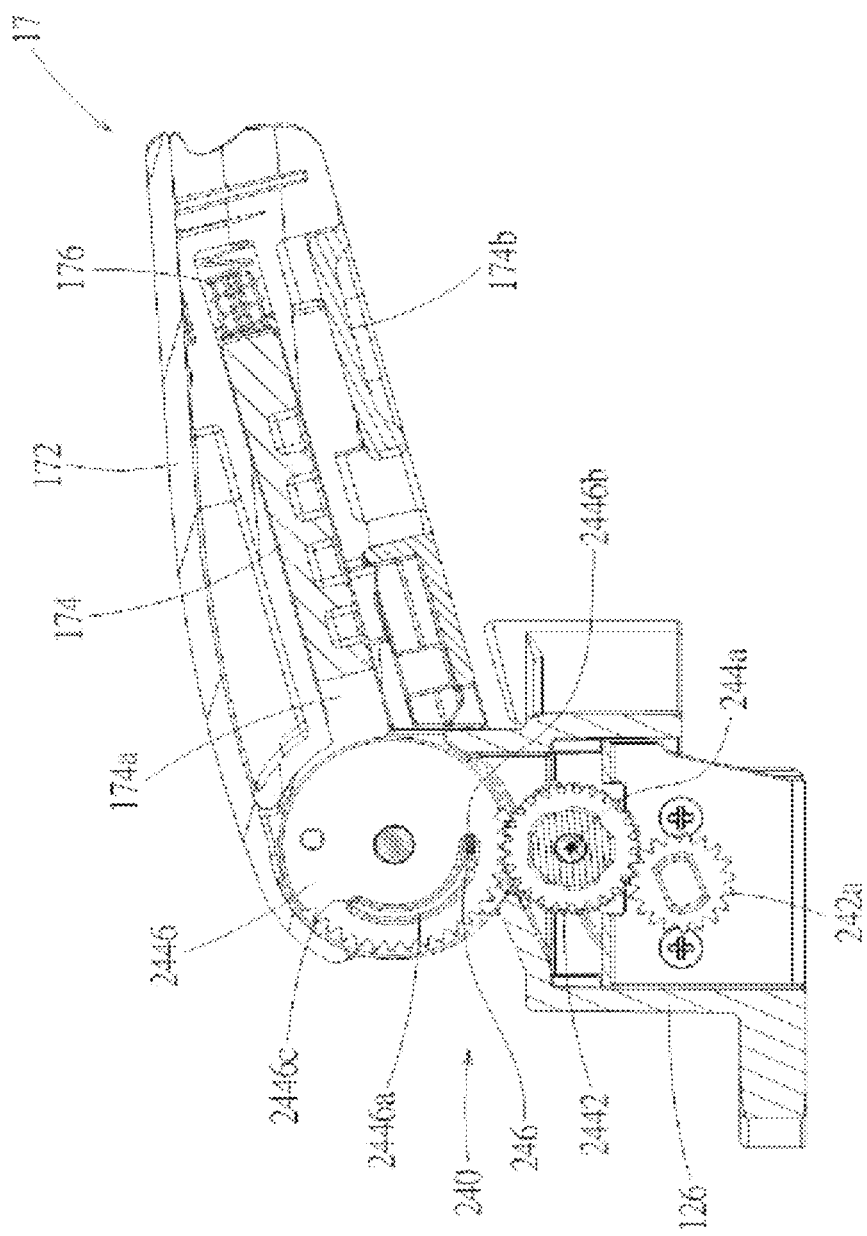
FIG. 13 is a cross-sectional view of the side protective block in the folded position viewed from another angle.
Figure 14:
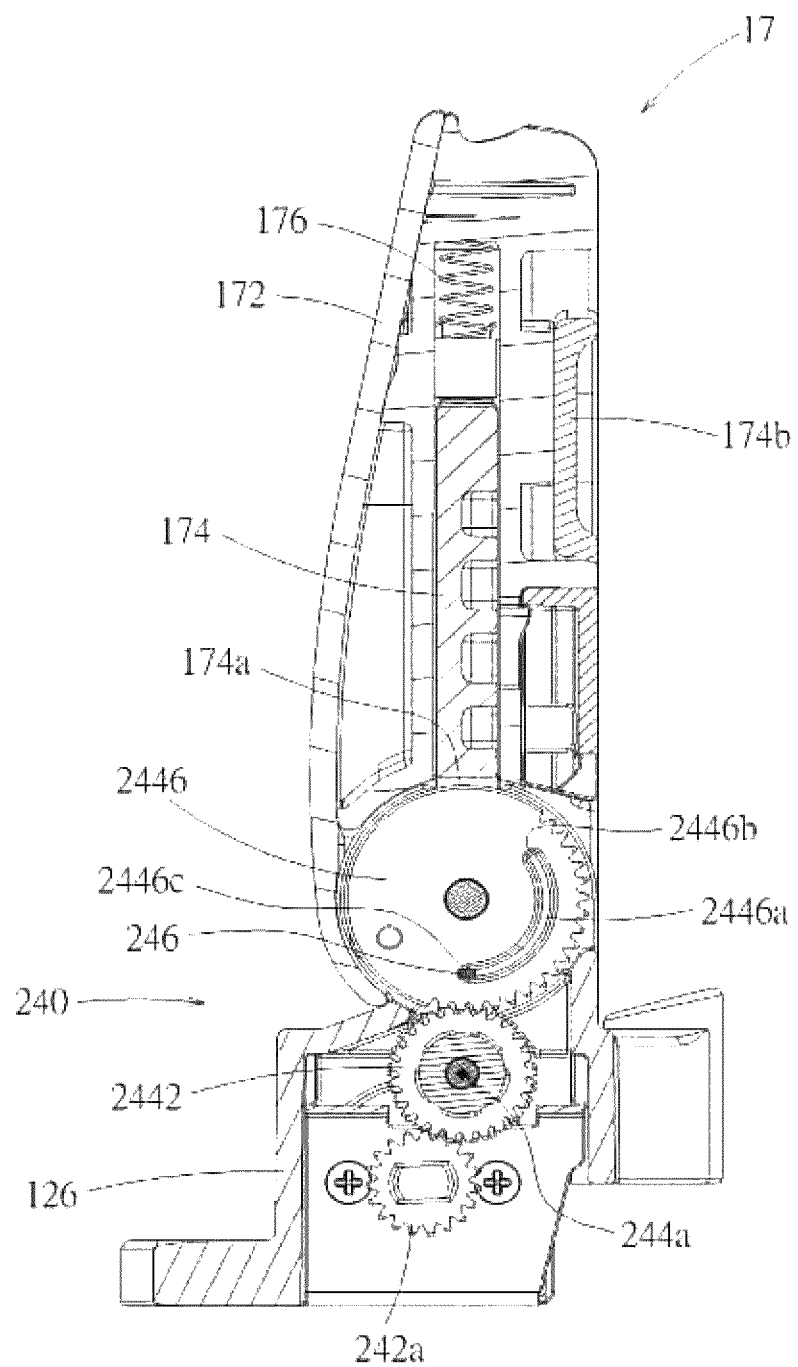
FIG. 14 is a cross-sectional view of the side protective block in the unfolded position viewed from another angle.

In addition, referring to FIGS. 9, 13 and 14, in this embodiment, the corresponding driving mechanism 240 of the side protective block driving module 24 includes a toggle switch 246 (shown by shading lines in FIGS. 13 and 14) arranged on the fixing seat 126. The driven gear 2446 of the driving mechanism 240 has an arc-shaped groove 2446*a*, and a triggering part of the toggle switch 246 is slidably disposed in the arc-shaped groove 2446*a*. When the side protective block 17 is in the folded position, an end 2446*b* of the arc-shaped groove 2446*a* toggles the triggering part of the toggle switch 246 in one direction; and when the side protective block 17 is in the unfolded position and in the locking state, the other end 2446*c* of the arc-shaped groove 2446*a* toggles the triggering part of the toggle switch 246 in the other direction. Thus, the side protective block driving module 24 may determine a state of the side protective block 17 via the toggle switch 246, to correctly control the operation of the driving mechanism 240.

Referring to FIGS. 1, 2, 15 to 17, in this embodiment, the fastening assembly 18 is movably protruded on the sitting part 122 of the safety seat 1, and the control circuit 10 further includes a position sensor 26 (shown by shading lines in FIG. 2). The position sensor 26 is electrically connected with the control module 20 for sensing a change of position of the fastening assembly 18. In the practical application, when a child is sitting on the sitting part 122 of the safety seat 1, the child (for example his/her hip) generally presses the fastening assembly 18, and the pressed fastening assembly 18 may be sensed by the position sensor 26. That is, in principle, when the control module 20 senses, through the position sensor 26, that the fastening assembly 18 is pressed, the control module 20 may determine that the child is sitting on the sitting part 122.

In this embodiment, the fastening assembly 18 includes, for example, an actuating part 182, a rotatable shaft part 184 and a fastening part 186. The fastening assembly 18 is rotatably connected to the sitting part 122 via the rotatable shaft part 184. The actuating part 182 extends upwards and towards the backrest 124, and has an end (i.e., a connecting end) connected to the rotatable shaft part 184 and the other end (i.e., a free end) relatively higher than the rotatable shaft part 184. Relatively, the fastening part 186 extends upwards and towards a direction opposite to the backrest 124, and has an end (i.e., a connecting end) connected to the rotatable shaft part 184 and the other end (i.e., a free end) relatively higher than the connecting end, so that the fastening assembly 184 is integrally formed in a V shape. In addition, a fastener 1862 is provided at the free end of the fastening part 186. The rotatable shaft part 184 is pivotally connected to the sitting part 122 through a rotatable shaft or a pin, and the fastening assembly 18 is integrally formed as a seesaw structure, to be rotatable relative to the sitting part 122, so that the position sensor 26 can sense a change of position (or angle) of the fastening assembly 18 caused by rotation, thereby determining whether the fastening assembly 18 is pressed down or not. In a preferred embodiment, the position sensor 26 is disposed within the fastener 1862. In other embodiments, the position sensor 26 may also be arranged at the actuating part 182 or the rotatable shaft part 184, which is not limited thereto in the present disclosure. In addition, in a preferred embodiment, the position sensor 26 may be a gyroscope; however, it should be understood for those skilled in the art that other types of position sensors, such as an accelerometer, may also be used instead of the gyroscope, which are not limited thereto in the present disclosure.

Figure 15:
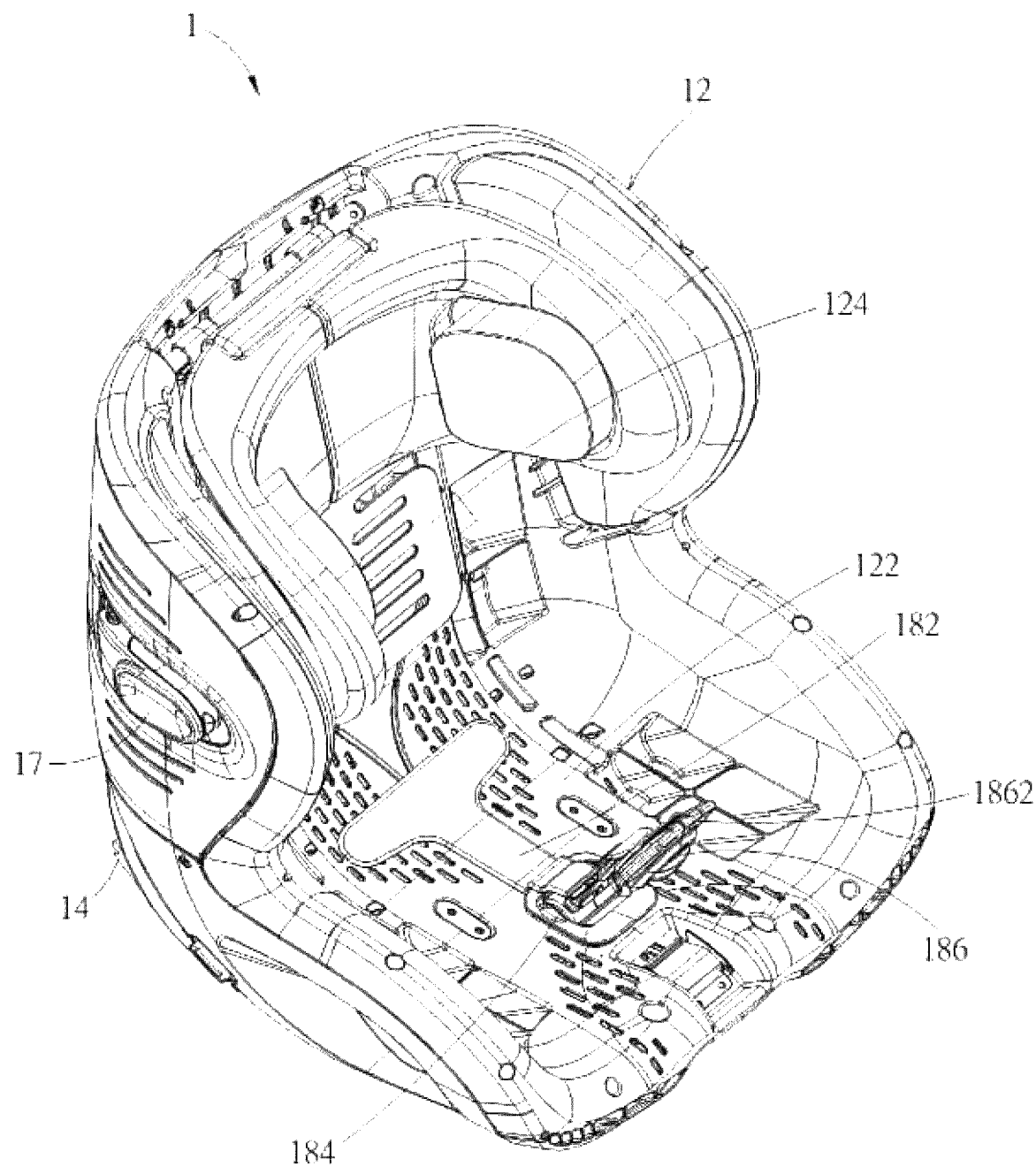
FIG. 15 is a schematic view of the safety seat shown in FIG. 2 after the fastening assembly is pressed down.
Figure 16:
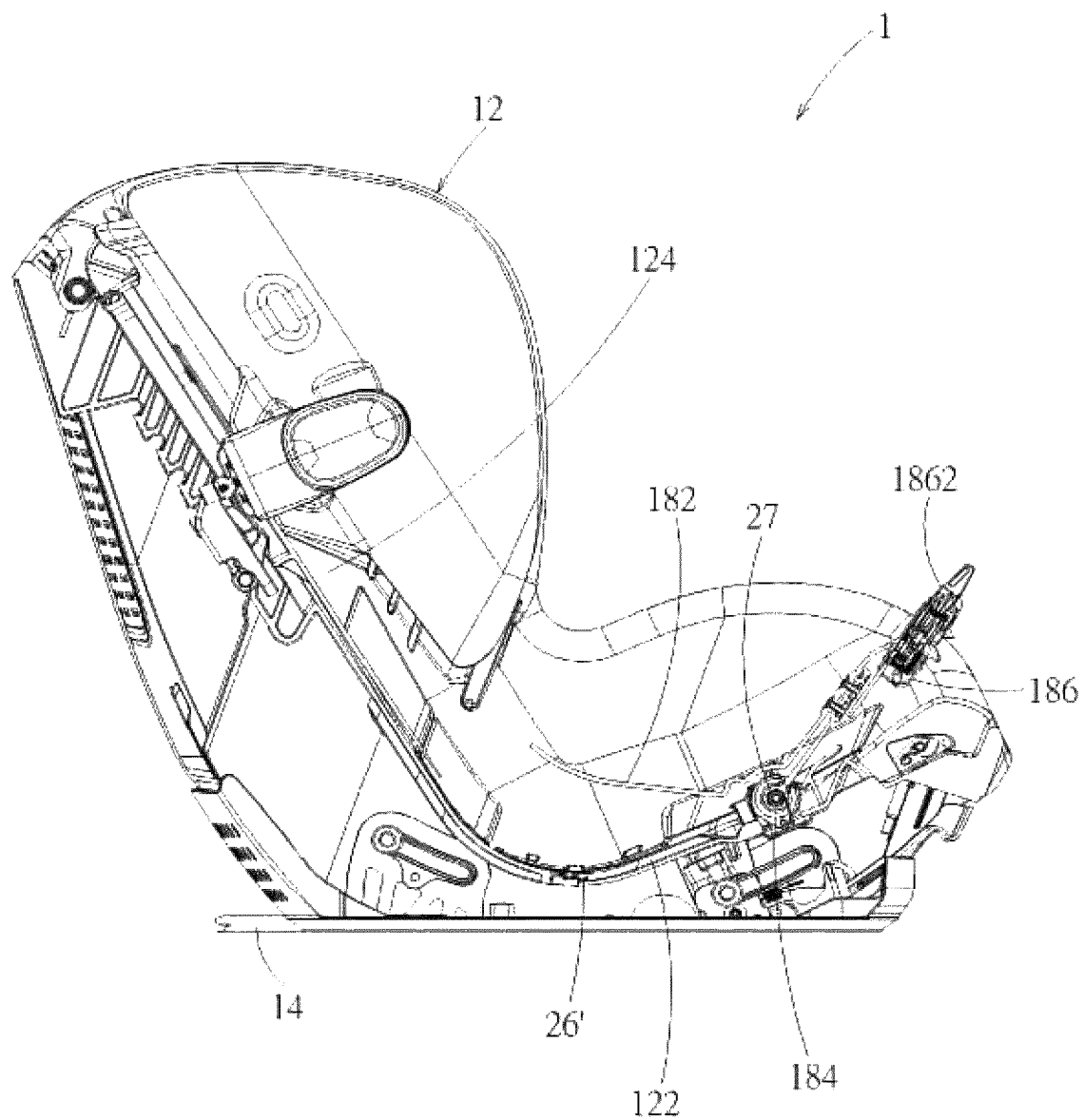
FIG. 16 is a cross-sectional view of the safety seat shown in FIG. 2.
Figure 17:
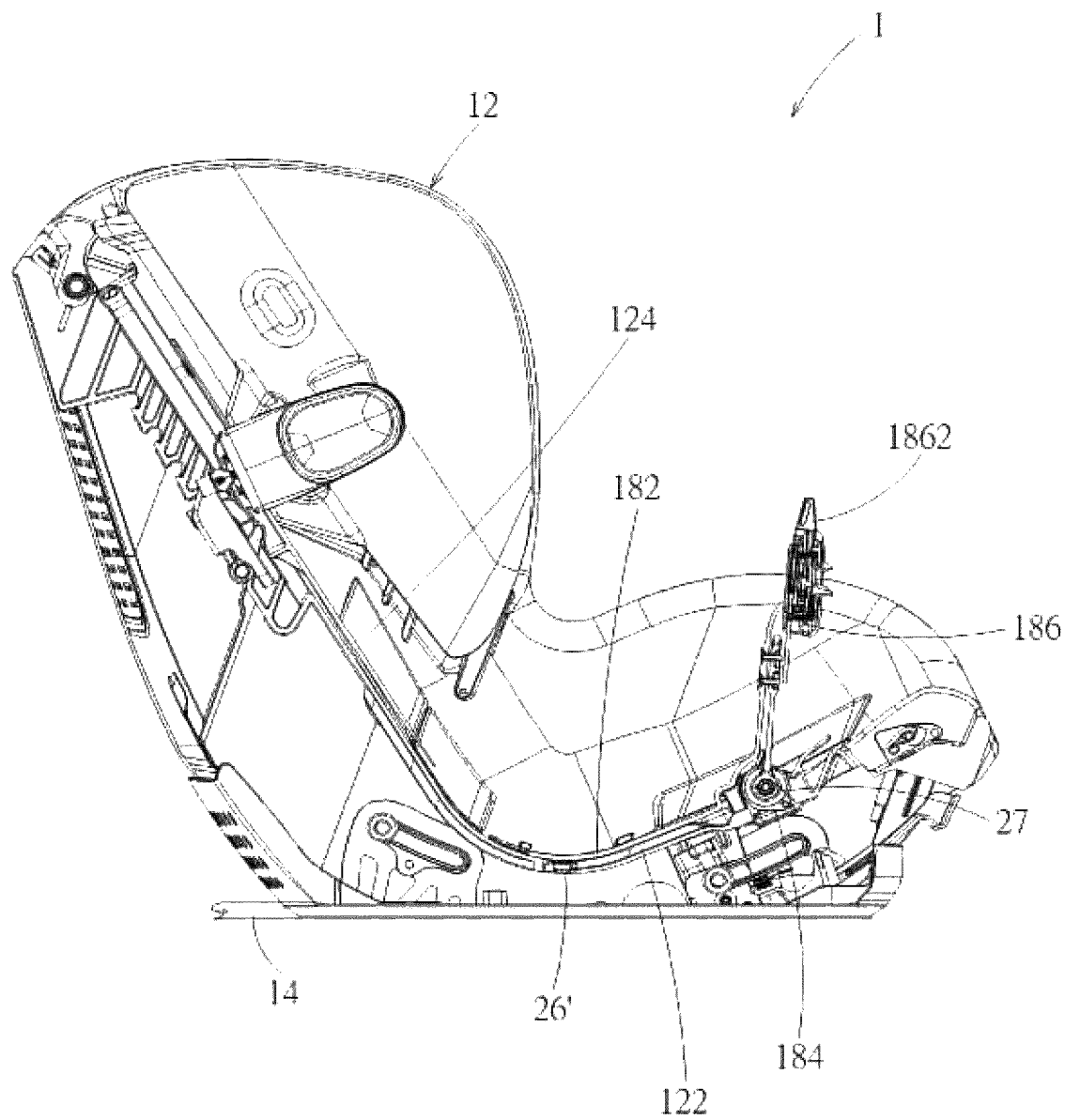
FIG. 17 is a cross-sectional view of the safety seat shown in FIG. 15 after the fastening assembly is pressed down.

In addition, in the foregoing description, the position sensor 26 is taken as an example of sensing the change of angle of the fastening assembly 18. In the practical application, the position sensor 26 may be implemented as a device that senses whether the fastening assembly 18 is in a pressed position (as shown in FIGS. 15 and 17). For example, a switch is used as a position sensor 26' (shown in a dotted line in FIGS. 16 and 17), which is arranged on the sitting part 122 and below the actuating part 182 of the fastening assembly 18, so that the actuating part 182 can directly trigger the position sensor 26' when the fastening assembly 18 is in the pressed position. This structural configuration also has a function of sensing whether the fastening assembly 18 is pressed. For example, the position sensor 26' may be a touch switch, an optical sensor, or the like, which is not limited thereto in the present disclosure.

In addition, in this embodiment, the fastening assembly 18 is integrally formed as a seesaw structure, and when the fastening assembly 18 is in the pressed position (for example, the child is not sitting on the safety seat 1), the rotatable shaft part 184 rotates forward, so that the fastening part 186 moves towards the front of the safety seat 1, which can avoid the parent from being interfered to move the child onto the sitting part 122 and facilitate the operation (for example, it is not necessary for the parent to operate the fastening part 186 by one hand while holding the child onto the sitting part 122). In addition, in this embodiment, the rotatable shaft part 184 is biased by a torsion spring 27 and intends to move to the non-pressed position, so that the actuating part 182 remains protruding relative to the sitting part 122 and the fastening part 186 remains at a position where relatively faces to the front side. In the practical application, concave and convex structures engaged with each other may also be arranged on the rotatable shaft part 184 and the sitting part 122 to remain the fastening part 186 at a position where relatively faces to the front side, which will not be described in detail.

In addition, in this embodiment, the control module 20 senses the actuating part 182 of the fastening assembly 18 via the position sensor 26 to determine whether the sitting part 122 is occupied; however, in the practical application, the control module 20 may also sense whether the sitting part 122 is occupied by a sensor provided independent of the fastening assembly 18. For example, this sensor may be a pressure sensor, a touch switch, a proximity sensor, or the like, which is arranged on the sitting part 122, and the sensor will be triggered when a child is sitting on the sitting part 122.

Figure 18:
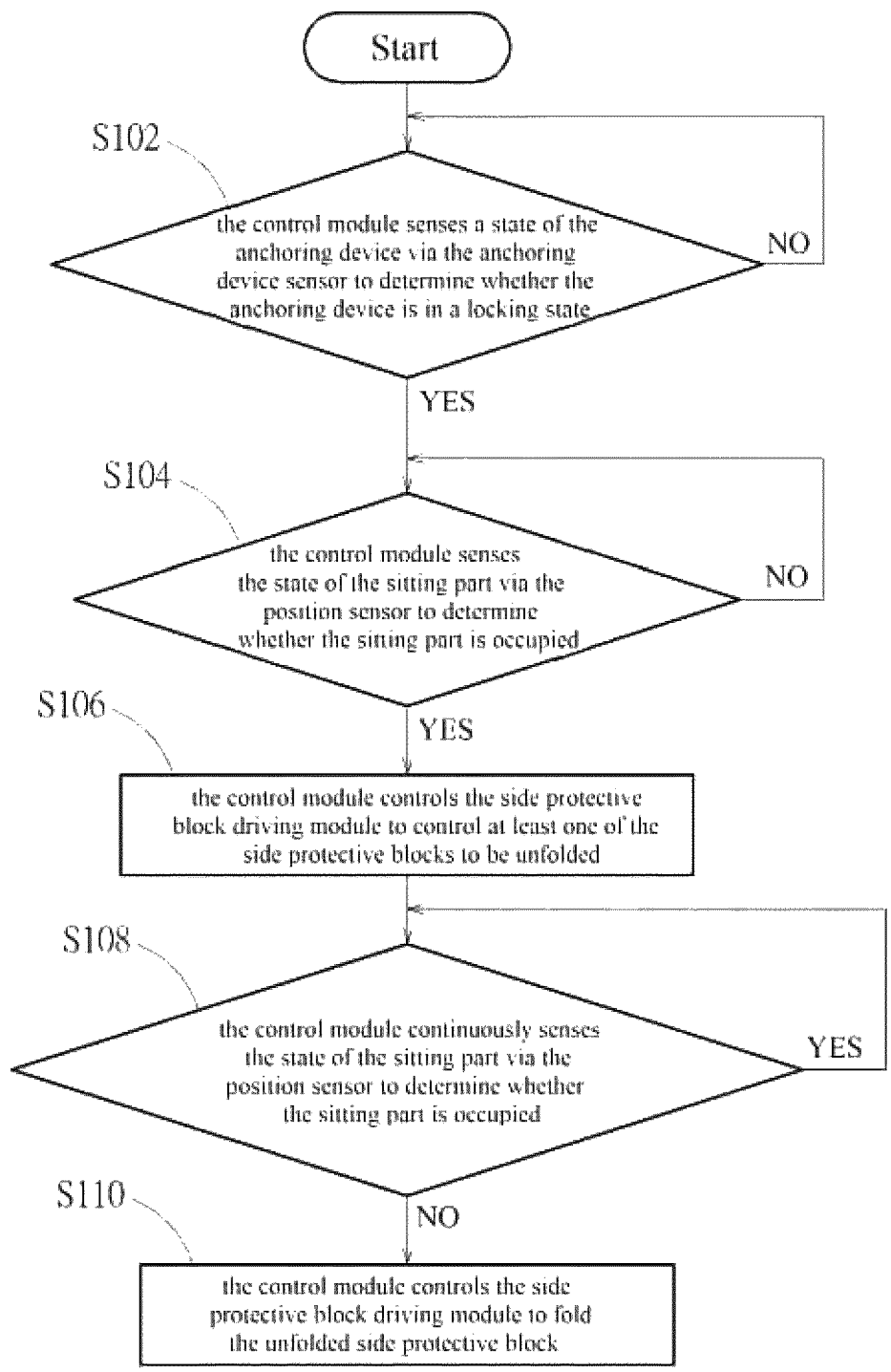
FIG. 18 is a flow diagram of a practical application of the safety seat shown in FIG. 1.

Referring to FIG. 18, which is a flow diagram of the safety seat 1 in the practical application. Therefore, for other descriptions of components of the safety seat 1, please refer to the previous related descriptions and corresponding drawings without further repeated description. As shown in a step S102 in FIG. 18, the control module 20 senses a state of the anchoring device 14 via the anchoring device sensor 22 to determine whether the anchoring device 14 is in a locking state. If "NO" (i.e., the anchoring device is not in the locking state), the process returns to the step S102; and if "YES" (i.e., the anchoring device is in the locking state), the control module 20 senses the state of the sitting part 122 via the position sensor 26 to determine whether the sitting part 122 is occupied (for example, whether a child is sitting on the sitting part 122), as shown in a step S104. If "NO" (i.e., the sitting part is not occupied), the process returns to the step S104; and if "YES" (i.e., the sitting part is occupied), the control module 20 controls the side protective block driving module 24 to control at least one of the side protective blocks 17 to be unfolded to increase the side impact protection capability of the safety seat 1, as shown in a step S106. Thereafter, the control module 20 continuously senses the state of the sitting part 122 via the position sensor 26 to determine whether the sitting part 122 is occupied (for example, whether the child sitting on the sitting part 122 is still on the sitting part 122), as shown in a step S108. If "YES" (i.e., the child is still sitting on the sitting part 122 and keeps pressing the actuating part 182 of the fastening assembly 18), the process returns to the step S108. If "NO" (i.e., the child has left the sitting part 122, and the actuating part 182 of the fastening assembly 18 is no longer pressed and protrudes from the sitting part 122), the control module 20 controls the side protective block driving module 24 to fold the unfolded side protective block 17, as shown in a step S110. In the step S106, the control module 20 may directly unfold the side protective blocks 17 on both sides, or decide which one or both of the side protective blocks 17 to be unfolded according to a set value. The set value may be set before or after the safety seat 1 is installed (for example, after the step S102, the user is prompted to set the set value, which will be described later).

In addition, in a preferred embodiment, the control circuit 10 further includes a communication module 28, which is electrically connected to the control module 20 (as shown in FIG. 1). In some embodiments, the communication module 28 may be a Bluetooth module, which may communicate with an external mobile device 5 through a Bluetooth transmission interface or an in-vehicle control system 4 on the vehicle. In other embodiments, the communication module 28 may also be a short-distance communication module such as WiFi, ZigBee or RFID. The setting procedure of the set value may be configured as that the control module 20 may send a request signal S1 to the in-vehicle control system 4 or the mobile device 5 and receive a setting signal S2 from the in-vehicle control system 4 or the mobile device 5, so as to complete the setting of the set value. The in-vehicle control system 4 and the mobile device 5 may execute corresponding mobile application programs, and the user selects one or both of side protective blocks 17 to be unfolded by operating the application program, for example, the side protective block 17 close to a door of the vehicle needs to be unfolded, and the in-vehicle control system 4 and the mobile device 5 send the setting signal S2 to the control module 20 according to the user's options. In the practical application, the control module 20 may also automatically set the side protective block 17 to be unfolded. For example, proximity sensors are provided on both sides of the seat body 12, corresponding to the side protective blocks 17, to sense whether they are close to the door of the vehicle. Thus, the control module 20 may determine which side of the seat body 12 is close to the door of the vehicle by the sensing of the proximity sensor, and accordingly performing set (that is, a side protective block 17 arranged on the side of the seat body 12 close to the door of the vehicle is a side protective block 17 to be unfolded).

Figure 19:
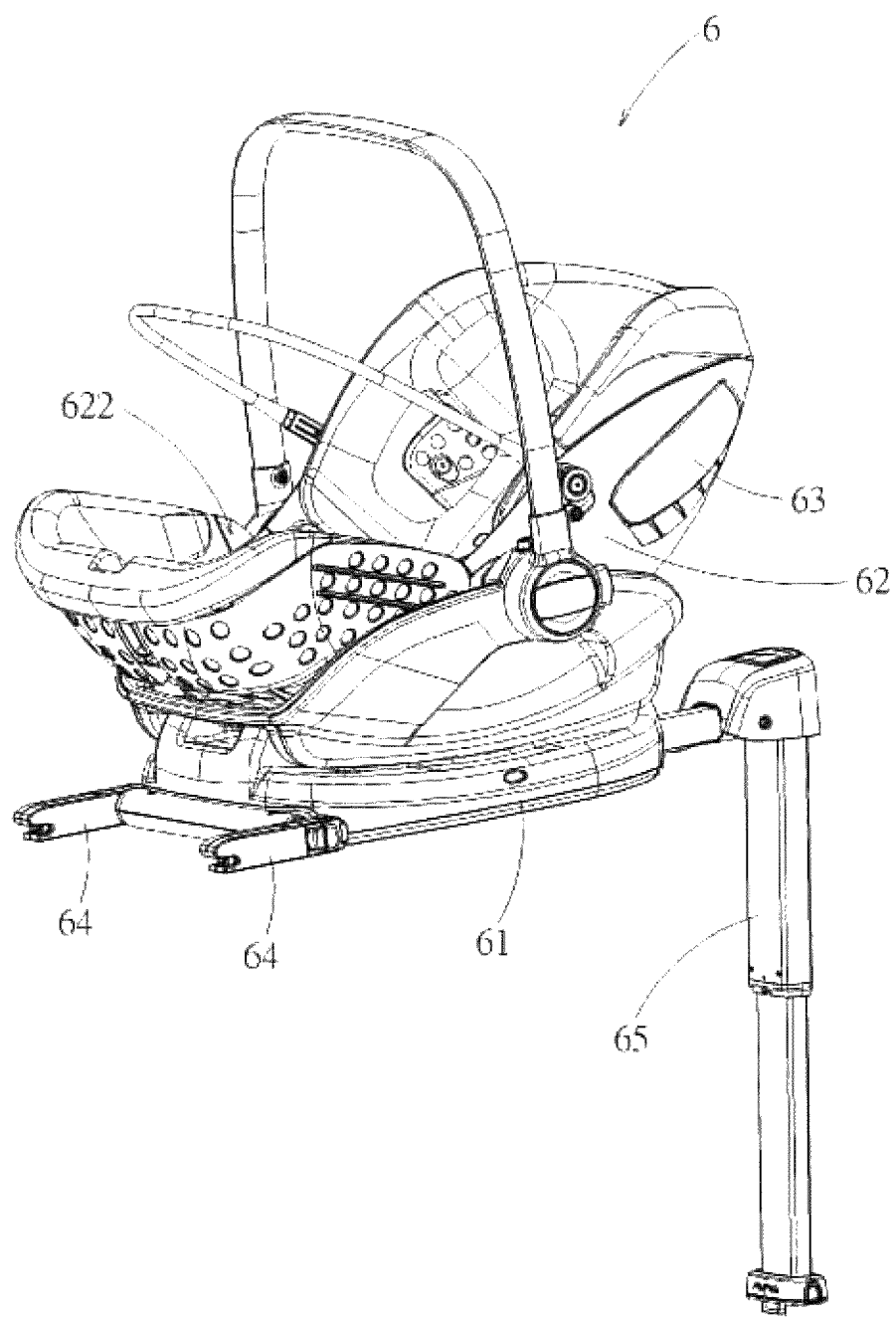
FIG. 19 is a schematic view of a safety seat according to another embodiment of the present disclosure.
Figure 20:
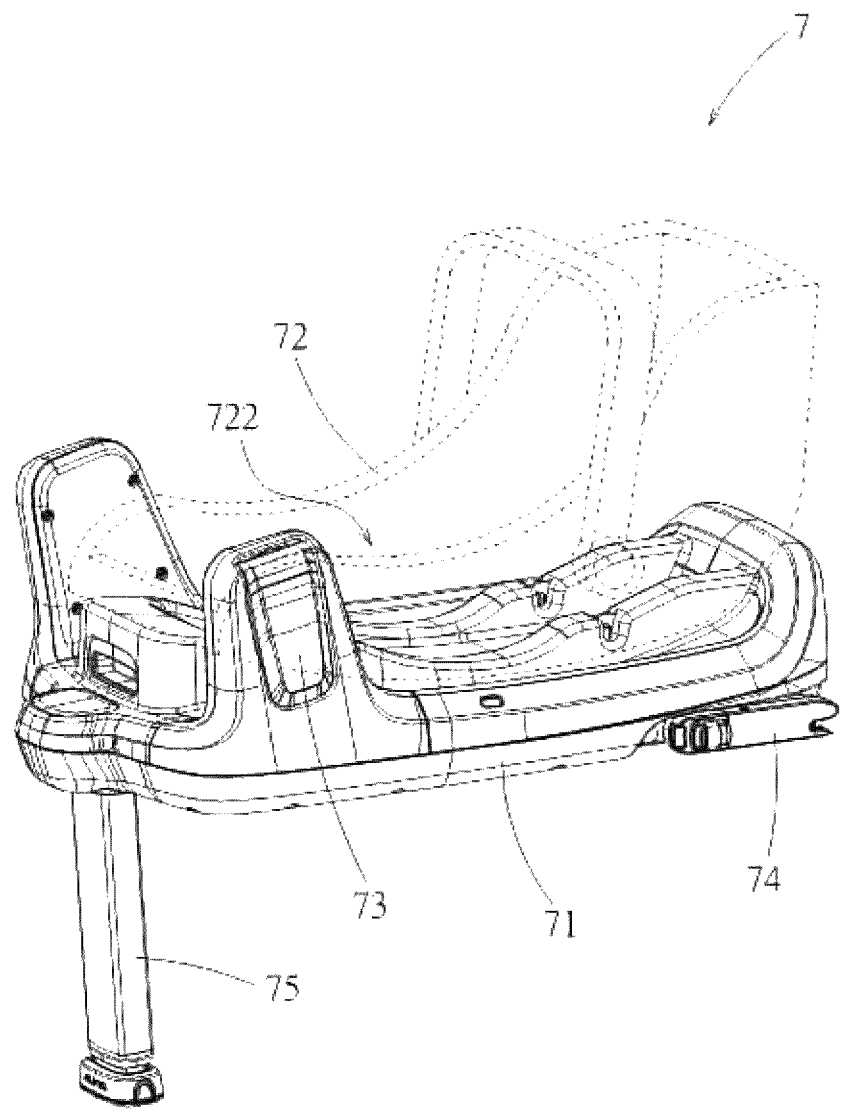
FIG. 20 is a schematic view of a safety seat according to another embodiment of the present disclosure.

As mentioned above, the safety seat 1 is, for example, integrally described as a single structure configuration and a safety seat having an adjustable height may also be applied, which will not be described in detail. In addition, in the practical application, a combined safety seat may also be applied. For example, as shown in FIG. 19, the safety seat 6 includes a base 61 and a basket 62, and the basket 62 is detachably connected to the base 61. The sitting part 622 is located on the basket 62, and the side protective block 63 is pivotally connected to the basket 62. The base 61 is locked to the anchoring structure provided on the vehicle seat via the anchoring device 64 to install the safety seat 6 on the vehicle seat. The safety seat 6 also includes an adjustable supporting leg 65 that abuts against the floor near the vehicle seat and supports the base 61. A docking electrical connection interface may be arranged between the basket 62 and the base 61, so that the control module may be electrically connected with the anchoring device sensor, the position sensor and the driving mechanism smoothly whether it is arranged on the base 61 or the basket 62. For example, as shown in FIG. 20, similar to the safety seat 6, the safety seat 7 includes a base 71 and a basket 72 (an outline of which is shown in a dotted line), and the basket 72 is detachably connected to the base 71. A sitting part 722 is located on the basket 72, and the side protective block 73 is pivotally connected to the base 71. The base 71 is locked to the anchoring structure provided in the vehicle seat via an anchoring device 74 to install the safety seat 7 on the vehicle seat. The safety seat 7 also includes an adjustable supporting leg 75 that abuts against the floor near the vehicle seat and supports the base 71. Similarly, a docking electrical connection interface may be arranged between the basket 72 and the base 71, so that the control module may be electrically connected with the anchoring device sensor, the position sensor and the driving mechanism smoothly whether it is arranged on the base 71 or the basket 72. In addition, when the basket 72 is separated from the base 71, it may be logically considered that the child (or a baby) needs to leave the vehicle, and the side protective blocks 73 are no longer needed, so that the control module may fold the unfolded side protective blocks 73. In addition, the foregoing description of the change of the safety seat 1 may be applied to parts of the safety seats 6 and 7, which will not be described in detail.

As mentioned above, after the safety seat 1, 6, 7 each is fixed to the anchoring structure of the vehicle, and when the child is sitting on the safety seat 1, 6, 7, the side protective blocks may be initiatively unfolded, to effectively solve the problem that the user may forget to unfold the side protective blocks, and improve the inconvenience that the user needs to manually unfold and fold the side protective blocks. In addition, in the practical application, the safety seat 1, 6, 7 may be provided with an energy storage device (such as a storage battery) to supply electric power required by the electronic device arranged on the safety seat 1, 6, 7, which will not be described in detail.

The above description is only preferred embodiments of the present disclosure, and is not intended to limit the present disclosure. For those skilled in the art, the present disclosure can be modified and varied. Any modification, equivalent substitution, improvement, etc. made within the spirit and principle of the present disclosure shall be included within the protection scope of the present disclosure.

What is claimed is:

1. A safety seat, comprising a sitting part, an anchoring device and two movable side protective blocks, wherein the safety seat comprises:
    an anchoring device sensor arranged adjacent to the anchoring device;
    a side protective block driving module connected with the side protective blocks to drive the side protective blocks to be folded or unfolded; and
    a control module electrically connected with the anchoring device sensor and the side protective block driving module, and configured to sense whether the sitting part is occupied,
    wherein the control module is configured to control the side protective block driving module to control at least one of the side protective blocks to be unfolded when the anchoring device sensor senses that the anchoring device is in a locking state.

2. The safety seat according to claim 1, wherein the control module is in communication with an in-vehicle control system or a mobile device, receives a setting signal from the in-vehicle control system or the mobile device, and is configured to control the side protective block driving module to control at least one of the side protective blocks to be unfolded according to the setting signal.

3. The safety seat according to claim 1, wherein the control module is configured to control the side protective block driving module to control the side protective blocks to be folded when the control module does not sense that the sitting part is occupied.

4. The safety seat according to claim 1, wherein the safety seat comprises a base and a basket, the sitting part is located on the basket, the basket is detachably connected to the base, the side protective blocks are pivotally connected to the base, and the control module is configured to control the side protective block driving module to control the side protective blocks to be folded when the basket is separated from the base.

5. The safety seat according to claim 1, wherein the anchoring device comprises a structural frame, an anchoring hook pivotally connected to the structural frame, and an operating element slidably arranged relative to the structural frame and connected to the anchoring hook, and the operating element has a sensed part which triggers the anchoring device sensor when the anchoring device is in the locking state.

6. The safety seat according to claim 1, wherein the safety seat comprises a seat body or base, the side protective blocks are pivotally connected to the seat body or base, the side protective block driving module is connected to the side protective blocks via two driving mechanisms which are respectively arranged corresponding to the two side protective blocks, and
    each of the driving mechanisms comprises a motor and a gear set, the motor is arranged in the seat body or base, and the motor is coupled to a corresponding side protective block via the gear set.

7. The safety seat according to claim 6, wherein the gear set comprises a driving gear, a clutch gear and a driven gear, the motor is engaged with the driving gear, the driving gear and the clutch gear are coaxially arranged and detachably engaged in an axial direction, the clutch gear is engaged with the driven gear, and the driven gear is connected with the side protective blocks to drive rotation of the side protective blocks.

8. The safety seat according to claim 7, wherein the gear set comprises a restoring spring which abuts against the driving gear or the clutch gear to engage the driving gear with the clutch gear.

9. The safety seat according to claim 7, wherein each of the side protective blocks comprises a locking block connected with the driven gear via a linkage rod, the seat body or base has a locking groove, and the driven gear is linked with the linkage rod to drive the locking block to slide into the locking groove.

10. The safety seat according to claim 1, wherein the safety seat comprises a fastening assembly movably protruded on the sitting part of the safety seat and a position sensor sensing a change of position of the fastening assembly, the control module electrically connected with the position sensor and the control module is configured to determine that the sitting part is occupied when the position sensor senses that the fastening assembly is pressed down.

11. The safety seat according to claim 10, wherein the fastening assembly comprises an actuating part, a rotatable shaft part and a fastening part, wherein the fastening assembly is rotatably connected to the sitting part via the rotatable shaft part, the actuating part extends upwards and towards a backrest of the safety seat and is connected to the rotatable shaft part, and the fastening part extends upwards and opposite to the backrest and is connected to the rotatable shaft part.

12. The safety seat according to claim 10, wherein the position sensor is a gyroscope and is arranged on the fastening assembly.

13. The safety seat according to claim 11, wherein a fastener is provided on a free end of the fastening part.

* * * * *